US008103563B2

(12) United States Patent
O'Neil

(10) Patent No.: US 8,103,563 B2
(45) Date of Patent: Jan. 24, 2012

(54) SYSTEM AND METHOD FOR MONITORING, CONTROLLING, AND DISPLAYING UTILITY INFORMATION

(75) Inventor: Adrian O'Neil, Madison, AL (US)

(73) Assignee: Carina Technology, Inc., Huntsville, AL (US)

( * ) Notice: Subject to any disclaimer, the term of this patent is extended or adjusted under 35 U.S.C. 154(b) by 0 days.

(21) Appl. No.: 11/955,010

(22) Filed: Dec. 12, 2007

(65) Prior Publication Data

US 2008/0154624 A1 Jun. 26, 2008

Related U.S. Application Data

(63) Continuation-in-part of application No. 11/824,131, filed on Jun. 29, 2007.

(60) Provisional application No. 60/817,487, filed on Jun. 29, 2006.

(51) Int. Cl.
*G07F 19/00* (2006.01)
*H04M 15/00* (2006.01)
*G07B 17/00* (2006.01)
*G06Q 40/00* (2006.01)

(52) U.S. Cl. ............................. 705/34; 705/30; 705/38

(58) Field of Classification Search .................. 705/34, 705/30, 38
See application file for complete search history.

(56) References Cited

U.S. PATENT DOCUMENTS

| | | | |
|---|---|---|---|
| 4,023,043 A | 5/1977 | Stevenson | 307/38 |
| 4,419,667 A | 12/1983 | Burr et al. | 340/825.06 |
| 4,587,417 A | 5/1986 | Duve et al. | |
| 4,766,331 A | 8/1988 | Flegel et al. | |
| 5,214,793 A | 5/1993 | Conway et al. | |
| 5,270,949 A * | 12/1993 | Atherton et al. | 702/62 |
| 5,495,167 A * | 2/1996 | Cotroneo | 324/74 |
| 5,502,339 A | 3/1996 | Hartig | 307/31 |
| 5,541,589 A * | 7/1996 | Delaney | 340/870.02 |
| 5,696,695 A | 12/1997 | Ehlers et al. | 364/492 |
| 5,897,607 A * | 4/1999 | Jenney et al. | 702/62 |
| 5,968,393 A | 10/1999 | Demaline | 219/492 |
| 5,995,601 A * | 11/1999 | Garland et al. | 379/106.03 |
| 6,047,274 A * | 4/2000 | Johnson et al. | 705/412 |
| 6,067,052 A * | 5/2000 | Rawles et al. | 343/741 |
| 6,124,800 A | 9/2000 | Beard et al. | |
| 6,265,699 B1 | 7/2001 | Scott | 219/483 |
| 6,293,471 B1 | 9/2001 | Stettin et al. | 236/20 R |
| 6,350,967 B1 | 2/2002 | Scott | 219/497 |
| 6,375,087 B1 | 4/2002 | Day et al. | 237/8 A |

(Continued)

OTHER PUBLICATIONS

Electric Energy Retail markets: THe federal register / FIND. Lanham. Jun. 13, 2008>vol. 71 Issue 113: p. 34083.*

(Continued)

*Primary Examiner* — Matthew Gart
*Assistant Examiner* — Harshad Parikh
(74) *Attorney, Agent, or Firm* — James Richards

(57) ABSTRACT

A system and method for monitoring, controlling, and displaying utility information is provided. A collar communicatively connected to the utility meter monitors power usage and provides usage data, power quality data, and other data to the utility and the customer. The system provides for pre-pay power, and the collar relay can automatically connect or disconnect power to a customer as required. The system provides intelligent remote control of utility meters via wireless or other communications means. A display unit communicatively coupled to the collar displays customer utility usage data. In one embodiment, the system allows reconnect after disconnect upon receiving a confirmation to restore power from a customer input device at the customer premises.

17 Claims, 10 Drawing Sheets

U.S. PATENT DOCUMENTS

| | | | |
|---|---|---|---|
| 6,424,270 B1 * | 7/2002 | Ali | 340/870.02 |
| 6,465,764 B1 | 10/2002 | Shahin | 219/486 |
| 6,560,409 B2 | 5/2003 | Troost, IV | 392/498 |
| 6,649,881 B2 | 11/2003 | Scott et al. | 219/492 |
| 6,675,071 B1 * | 1/2004 | Griffin et al. | 700/286 |
| 6,737,983 B1 | 5/2004 | Temple | |
| 6,785,466 B1 | 8/2004 | Jackson et al. | 392/454 |
| 6,795,644 B2 | 9/2004 | Bradenbaugh | 392/463 |
| 6,955,301 B2 | 10/2005 | Munsterhuis et al. | 236/20 R |
| 6,957,058 B2 * | 10/2005 | Chan et al. | 455/406 |
| 6,961,641 B1 | 11/2005 | Forth et al. | |
| 6,965,303 B2 | 11/2005 | Mollenkopf | |
| 6,989,514 B2 | 1/2006 | Patterson et al. | 219/492 |
| 6,993,417 B2 | 1/2006 | Osann, Jr. | |
| 7,010,363 B2 | 3/2006 | Donnelly et al. | 700/19 |
| 7,065,431 B2 | 6/2006 | Patterson et al. | 700/299 |
| 7,075,414 B2 | 7/2006 | Giannini et al. | |
| 7,098,783 B2 * | 8/2006 | Crichlow | 340/531 |
| 7,117,825 B2 | 10/2006 | Phillips | 122/4 A |
| 7,230,544 B2 * | 6/2007 | Van Heteren | 340/870.03 |
| 7,274,305 B1 | 9/2007 | Luttrell | |
| 7,432,477 B2 | 10/2008 | Teti | 219/492 |
| 7,503,287 B2 | 3/2009 | Friedrich | 122/14.22 |
| 2001/0051933 A1 * | 12/2001 | Rowley et al. | 705/412 |
| 2002/0010690 A1 * | 1/2002 | Howell et al. | 705/412 |
| 2002/0059137 A1 * | 5/2002 | Freeman et al. | 705/38 |
| 2002/0077729 A1 * | 6/2002 | Anderson | 700/291 |
| 2003/0063723 A1 * | 4/2003 | Booth et al. | 379/106.03 |
| 2003/0156041 A1 * | 8/2003 | Taisto et al. | 340/870.02 |
| 2003/0225713 A1 * | 12/2003 | Atkinson et al. | 705/412 |
| 2004/0075343 A1 | 4/2004 | Wareham et al. | |
| 2004/0117330 A1 | 6/2004 | Ehlers et al. | |
| 2004/0243524 A1 * | 12/2004 | Crichlow | 705/412 |
| 2005/0021393 A1 | 1/2005 | Bao et al. | |
| 2005/0240315 A1 * | 10/2005 | Booth et al. | 700/295 |
| 2005/0246295 A1 * | 11/2005 | Cameron | 705/412 |
| 2006/0031180 A1 | 2/2006 | Tamarkin et al. | |
| 2006/0106741 A1 * | 5/2006 | Janarthanan | 705/412 |
| 2006/0129498 A1 * | 6/2006 | Baraty | 705/63 |
| 2007/0205915 A1 | 9/2007 | Shuey et al. | |
| 2007/0255612 A1 * | 11/2007 | Baraty | 705/10 |
| 2008/0048883 A1 * | 2/2008 | Boaz | 340/870.02 |
| 2008/0133065 A1 | 6/2008 | Cannon et al. | |
| 2008/0154624 A1 * | 6/2008 | O'Neil | 705/1 |
| 2008/0238710 A1 | 10/2008 | Tolnar et al. | |
| 2009/0105888 A1 | 4/2009 | Flohr et al. | |
| 2010/0094737 A1 * | 4/2010 | Lambird et al. | 705/34 |
| 2010/0228601 A1 * | 9/2010 | Vaswani et al. | 705/10 |

OTHER PUBLICATIONS

Echelon Approved as Next Generation Meter Supplier: Business wire: New York: Jun. 29, 2006, p. 1.*

Key Rolls are seen in Europe for telemedicine, Remote Monitoring, Biomedical Business and Technology, Feb. 1, 2004.*

Technology Marches on: Reeves Journal, V86, No. 6, p. 34.*

* cited by examiner

SYSTEM AND METHOD FOR MONITORING, CONTROLLING, AND DISPLAYING UTILITY INFORMATION

REFERENCE TO RELATED APPLICATIONS

This application is a continuation-in-part of and claims priority to non-provisional patent application U.S. Ser. No. 11/824,131, entitled "System and Method for Controlling a Utility Meter" and filed on Jun. 29, 2007, which is fully incorporated herein by reference. This application further claims priority to U.S. provisional patent application No. 60/817,487, filed Jun. 29, 2006 entitled "Ethernet Meter Device and System," which is fully incorporated herein by reference.

FIELD OF THE INVENTION

The present invention relates generally to the field of utility service provision, and specifically to a system and method for monitoring and displaying utility usage by a customer. The invention provides a long range, communication independent, collar-based, device with associated software and firmware, capable of power supply output, electric service disconnect/reconnect, limiting current, metering information, and communicating with and controlling local area network devices for provision of application functions desirable in the utility industry. The invention further allows utility service providers the ability to obtain real time metering information via a collar-mounted device that is installed between the existing meter socket and the electric meter.

BACKGROUND OF THE INVENTION

Most utility providers measure the usage of energy or gas or water through devices called meters. These meters may be electro-mechanical or electronic or a combination of both. Most utilities obtain monthly meter readings for the purposes of rendering a bill based on the consumption measured by the meter. Obtaining meter readings can be a laborious and costly process for the utility, as historically meter reading required individuals going house to house and manually reading the meter and recording the results.

Recently, newer technologies have allowed for remote automation of the meter reading process. These technologies include public and private network communications, fixed radio frequency (RF) meter reading, meter reading over a power line carrier and even satellite meter reading. These meter reading technologies are centered on the process of obtaining a monthly meter reading, which is part of the larger system process of billing. As technology continues to expand toward increased data throughput and reducing size and cost of the required devices, expanding capabilities of meter information have emerged, resulting in changes in the way utilities think of metering information.

Previously, devices performing these automatic metering functions were required to use one specific communication methodology protocol. Most devices were only capable of one way communication, i.e., from the meter back to the utility. Existing metering technologies have focused on the measuring function of meter reading and have not considered other important aspects of the electric system networks that are dynamically occurring at the customer premises. The present invention takes advantage of the broadband technologies now available to render to the utility, and to the customer, vital information about the quality of the electric service being provided.

A disadvantage of the historical metering approach is that metering has been viewed as only the "cash register" for the utility. Hence utilities have not been focused on the benefits of communicating to the meter, and instead have targeted merely receiving information from the meter. Utilities typically render a bill to their customers monthly and the customers have no way of validating energy use unless they want to dispute the bill. With broadband technologies now available to the home, the present invention allows the utility to interrogate the electric system at the premises in near real time. This encompasses much more than meter reading or measuring voltage as historically performed, and also includes information about voltage anomalies, load profiling and estimation, and energy efficiency estimation. The present invention allows a true near-real-time diagnostic system of the utility service which now opens the door for a variety of applications to help not only the utility provide better service, but to also allow the customer for the first time to have the necessary information to help control energy consumption and improve efficiency.

SUMMARY OF THE INVENTION

The present invention is capable of communicating bi-directionally through a variety of communication platforms including, but not limited to, analog cell systems, digital cell systems, Ethernet, short range radio wireless, ZigBee, power line carrier, Hybrid-Fiber Coax, RF, WiFi, and WiMax. The system allows for the addition or substitution of other backhaul methodologies. More importantly, the present invention has reduced duplication of functionality, reduced equipment size and cost to achieve that functionality. The present invention further provides application functionality that currently does not exist, specifically the ability to read meters via Ethernet or other communications platforms and provide a power supply in the same collar device. Existing technology can read meters and store voltages for the purposes of measuring electric energy and voltage. The present invention takes that information and transforms it into intelligence for the utility and the customer.

There are many specific advantages offered by the present invention. Other meter reading devices read meter registers and voltage and transmit that information back to the utility via an Ethernet network. These devices include an Ethernet connection in the meter itself. Therefore, in order to add functionality to the devices, the existing meters must be replaced. Because the present invention is collar-based, it can be used with existing meters.

The present invention provides the utility customer access to the same, real-time information available to the utility. This capability is achieved through a customer interface unit (CIU) located in the premises that allows the customer to view metering information including: voltage current information; power quality information including voltage transients; power factor, harmonics; energy usage information; and even anticipated energy consumption, over a specified time period.

The information may be communicated wirelessly or through the power line carrier between the collar-based meter device and the internal customer display unit in a real time environment. This information includes real time kilowatt hours, voltage profile, total harmonics distortion and power factor. This information is measured over a 1 minute, 5 minute, 15 minute interval basis, or variable time basis. The voltage profile may be presented over the same time frames as well. Temperature inside the collar device is also available. The system of the present invention includes the ability to display energy consumption by appliance and provide the utility the opportunity to utilize the system for demand side management and supports a new level of energy education at the customer level.

In one embodiment, the system provides for pre-pay power, and the collar relay can automatically connect or disconnect power to a customer as required. The system provides intelligent remote control of utility meters via wireless or other communications means. A display unit communicatively coupled to the collar displays customer utility usage data.

In one embodiment, power may be disconnected based on customer account status. When the account is restored to a positive account balance, a control processor receives the restored account information from a utility control server using a network interface, the control processor displays the restored account information using the display unit, the control processor subsequently receives a confirmation to restore power from the customer via a customer input device at said customer premises, and the control processor controls the relay to restore power to the customer premises in response to receiving the confirmation to restore power.

In one embodiment, the customer interface device may enable the customer to monitor current usage in dollars as well as KWh. Estimated time to depletion of the account may be shown as well as utility company determined alarms at predetermined countdown milestones. Upon depletion of funds, the meter will automatically disconnect power to the home and send a disconnected status back to the utility billing system. Payments for prepaid power may be made through utility company regular methods of payment and a positive account balance will be communicated from the utility system server software prompting an automatic "arm for reconnect" status. A reconnect button on the customer interface device will enable the customer to turn power back on.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein.

These and other embodiments of the present invention will also become readily apparent to those skilled in the art from the following detailed description of the embodiments having reference to the attached figures, the invention not being limited to any particular embodiment(s) disclosed.

BRIEF DESCRIPTION OF THE DRAWINGS

The present invention is described with reference to the accompanying drawings. In the drawings, like reference numbers indicate identical or functionally similar elements.

DETAILED DESCRIPTION

Figure 1:
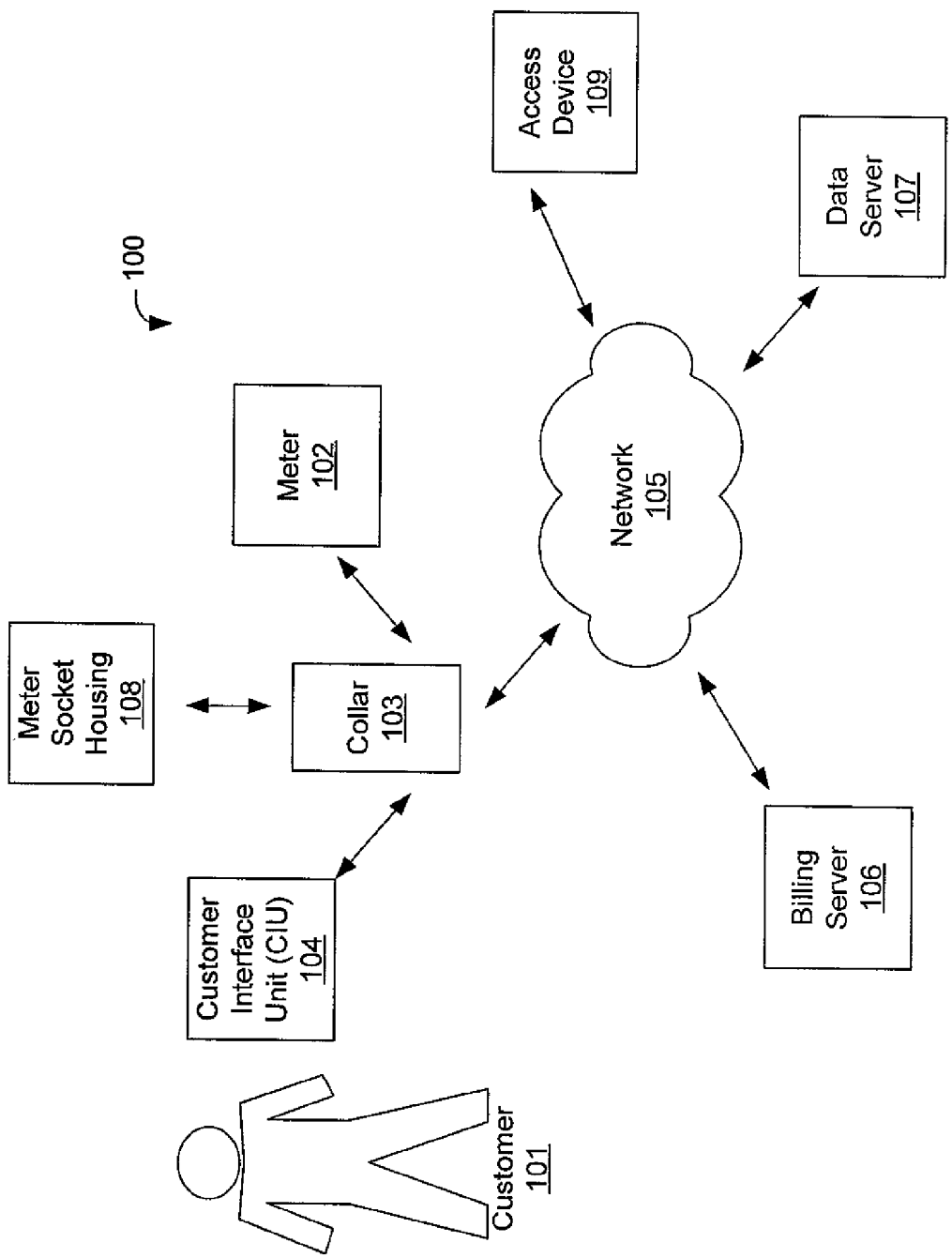
FIG. 1 is a block diagram illustrating a system in accordance with an exemplary embodiment of the present disclosure.

The present invention and its advantages are best understood by referring to the drawings. The elements of the drawings are not necessarily to scale, emphasis instead being placed upon clearly illustrating the principles of the invention.

Embodiments of the present disclosure generally pertain to systems and methods for reading and controlling utility meters. FIG. 1 illustrates a collar-based utility meter control system 100 in accordance with an exemplary embodiment of the present disclosure. The system 100 comprises an adapter collar 103 communicating with a utility meter 102 and a customer interface unit (CIU) 104. The utility meter 102 may be of any type provided by a utility service provider, and in some embodiments is an American National Standards Industry (ANSI) C12 meter. Although this specification primarily describes a power meter, the present invention may also be used for gas and water meters.

The collar 103 connects between a standard utility meter socket housing 108 and utility meter 102 and communicates via a network 105 with a billing server 106, a data server 107, and an access device 109. An end customer 101 accesses CIU data 523 [FIG. 5] via the CIU 104.

The access device 109 provides user interfaces at the utility (not shown) for functions such as hardware configuration, monitoring and control, system administration, interfaces to other electronic systems, historical archiving, alarm generation and message forwarding, and report generation. The access device 109 may be any suitable computer known in the art, and in one embodiment is a "thin client" device which depends primarily on the data server 107 for processing activities, and focuses on conveying input and output between the utility user (not shown) and the data server 107.

The network 105 may be of any type network or networks known in the art, such as Ethernet, analog cellular, digital cellular, short range radio wireless, Wifi, WiMax, broadband over power line, coaxial cable, and the like. The network 105 may be any combination of hardware, software, or both.

In some embodiments of the invention, Wide Area Network (WAN) methodologies will be utilized for communicating information and control over the network 105. The type of WAN will determine whether a Local Area Network (LAN) is necessary. In situations in which the WAN requires ongoing communication charges (i.e. GSM/GPRS), in which a WAN connection will not be available at all of the meters 102, or in which the cost of the WAN hardware is prohibitive, a LAN may be established between the local vicinity collars 103 and other utility-related devices (such as load management devices, solid state thermostats, etc, (not shown)) to reduce the number of WAN end points (not shown) required in the network 105.

In one embodiment of the system 100, the customer 101 of a utility service pre-pays for his utility services. This can be done in a form of a check, cash, credit card, ATM card, or other form of payment approved by the utility service. When a customer 101 pre-pays for his utility services, the billing server 106 stores data indicative of any unapplied payments. "Unapplied payments" refers to amounts that have been pre-paid but not yet applied to the customer's billing account.

Figure 2:
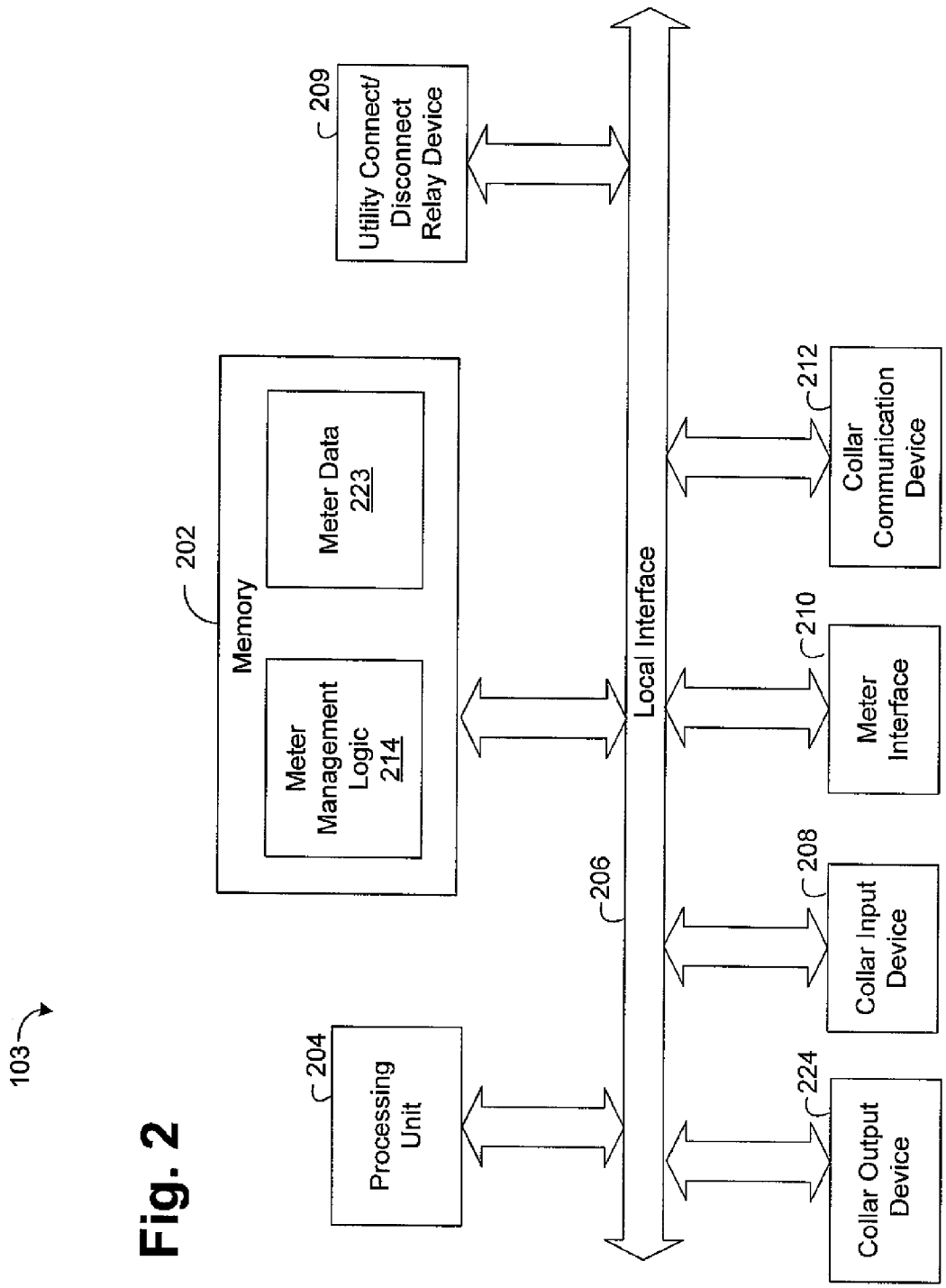
FIG. 2 depicts an exemplary collar of the system of FIG. 1.

FIG. 2 depicts an exemplary collar 103 of the present disclosure. The exemplary collar 103 generally comprises a processing unit 204, a collar output device 224, a collar input device 208, a meter interface 210 and a collar communication device 212, all communicating over a local interface 206. The collar 103 further comprises meter management logic 214 and meter data 223. The meter management logic 214 and the meter data 223 can be software, hardware, or a combination thereof. In the exemplary collar 103, meter management logic 214 and meter data 223 are shown as stored in memory 202. Memory may be of any suitable type of computer memory known in the art, such as RAM, ROM, flash-type, and the like.

As noted herein, the meter management logic 214 and the meter data 223 are shown in FIG. 2 as software stored in memory 202. When stored in memory 202, the meter management logic 214 and the meter data 223 can be stored and transported on any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

The processing unit 204 may be a digital processor or other type of circuitry configured to run the meter management logic 214 by processing and executing the instructions of the meter management logic 214. The processing unit 204 communicates to and drives the other elements within the collar 103 via a local interface 206. Furthermore, the collar input device 208 provides a direct interface to collar components as may be required, for example, for troubleshooting purposes or to download firmware directly to processing unit 204. The collar input device 228 may be software, hardware, or a combination thereof.

In addition, the collar output device 224, for example, a universal serial bus (USB) port, wireless IR antenna, or other type network device, connects the collar 103 with the network 105 for communication with the billing server 106 and/or data server 107 (FIG. 1).

The meter management logic 214 performs a daily read of the meter 102 via the meter interface 210 and stores such meter data 223 obtained in memory 202. The meter interface 210 connects the collar 103 to meter 102 (FIG. 1), and may be software, hardware, or a combination thereof. The meter management logic 214 also transmits the meter data 223 to the billing server 106 (FIG. 1) via the communication device 212. The collar communication device 212 interfaces between the collar 103 and the network 105 (FIG. 1) and may comprise software, hardware, or a combination thereof. The collar communication device 212 may consist of, for example, a LAN radio, a WAN radio, an AMPS radio, or other devices suitable for connection to the network 105.

Figure 3:
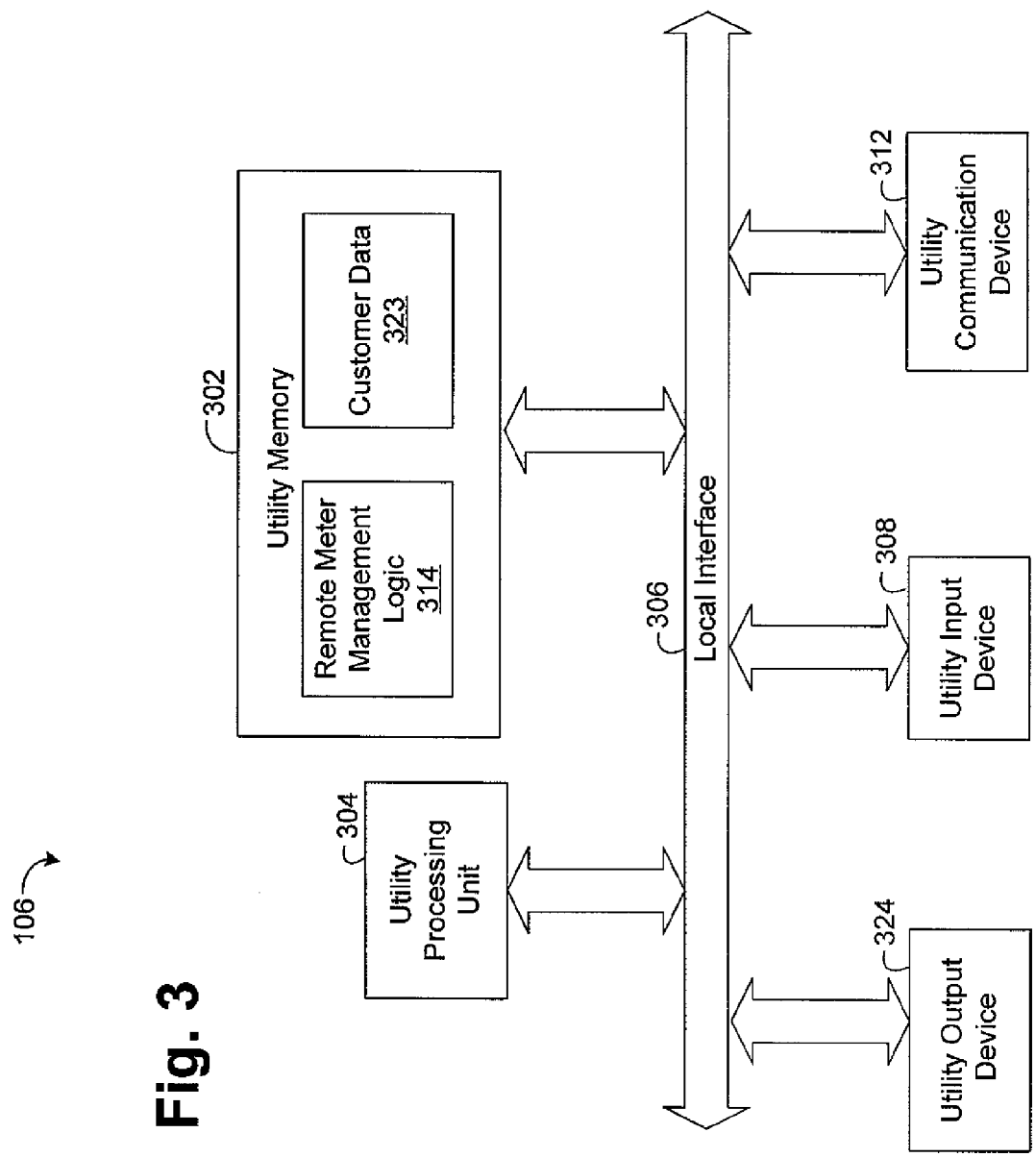
FIG. 3 depicts an exemplary billing server of the system of FIG. 1.
Figure 4:
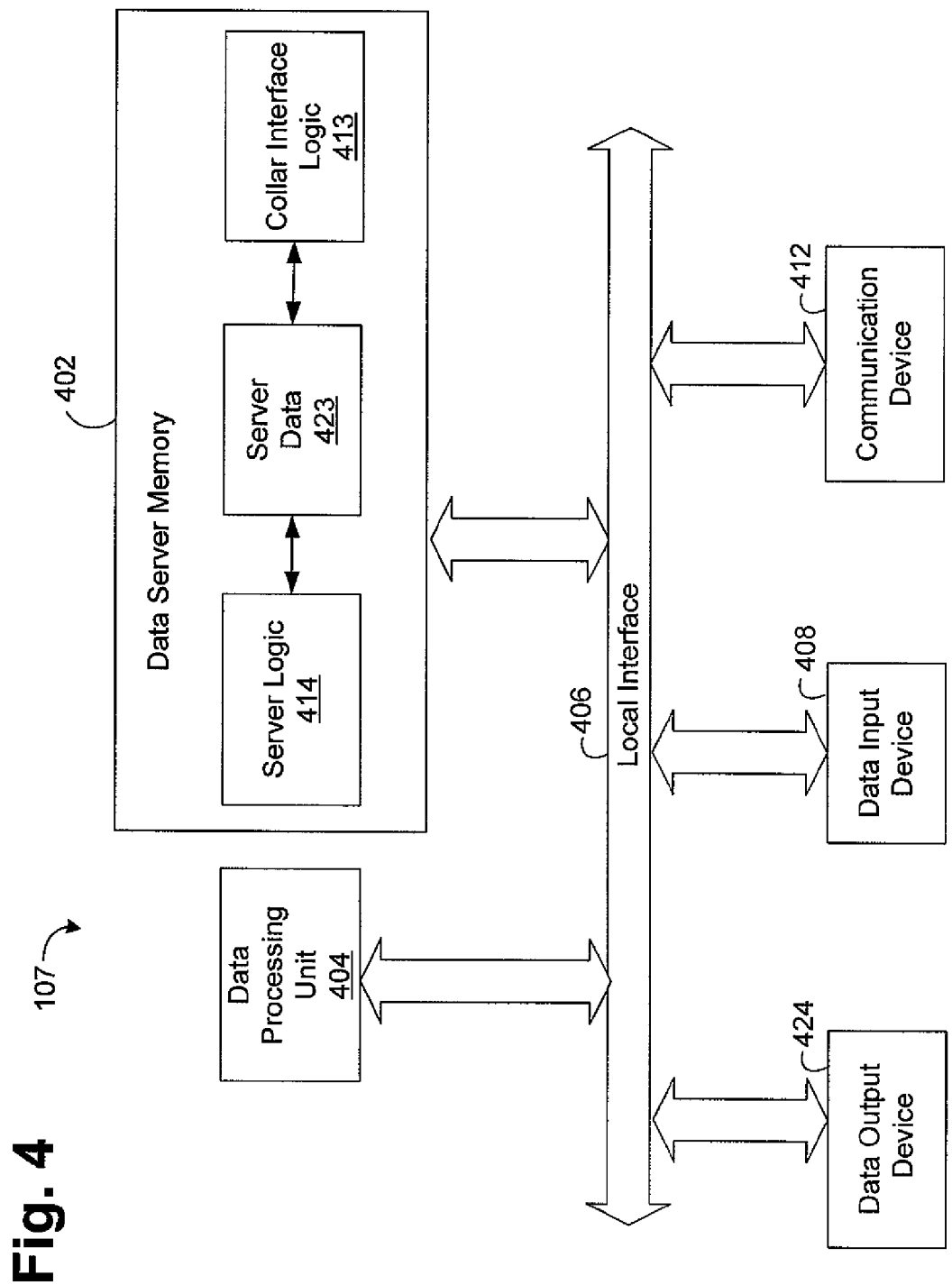
FIG. 4 depicts an exemplary data server of the system of FIG. 1.

The meter management logic 214 also retrieves customer data 323 [FIG. 3] and server data 423 [FIG. 4] from the billing server 106 across the network 105 via collar communication device 212. Meter management logic 214 further provides meter data 223 to other devices, such as the CIU 104 [FIG. 1], via output device 224, which may be software, hardware, or a combination thereof. The CIU 104 provides end customers 101 (FIG. 1) with a display of CIU data 523 [FIG. 5]. In certain embodiments of the invention, customers may provide input to the utility service provider via the CIU 104, as is further discussed below. Output device 224 may comprise any number of communications mediums known in the art, for example a wireless solution such as ZigBee 802.11b or through power line carrier (PLC), or the like.

The meter management logic 214 also sends commands to the utility connect/disconnect relay device 209, which connects and disconnects utility services to a premises (not shown) upon command from the utility service provider based upon its rules or automatically, as may be the case for a pre-pay customer whose credit has been exhausted. The utility has the flexibility to allow the relay device 209 to perform the disconnection/reconnection functions automatically (via the meter management logic 214) or with utility-based business rules. For example, if the weather is too cold or the individual is on a fixed income, the utility may desire the flexibility to elect to waive the automatic disconnection capability.

The meter management logic 214 may also be used as a current limiting method to restrict usage to the customer 101 to a predetermined threshold level, either on a per-day total usage level or a realtime load level. If the customer 101 exceeds the predetermined threshold level, the meter management logic 214 triggers the relay to disconnect the power. The utility connect/disconnect relay device 209 may be software, hardware, or a combination thereof.

The meter management logic 214 may also report power outages to the utility service provider, and may count and report any momentary power outages. The meter management logic 214 may also sample and log line voltage over time, so that voltage profile reports can be generated. The period of sampling, sampling rate, alarm thresholds, and repeat alarms are some of the parameters configurable by the utility.

The meter management logic 214 may also sample and log customer demand over time, so that user demand reports can be generated. The sampling period and sampling rate are some of the parameters configurable by the utility. The meter management logic 214 may also control the customer's appliances (not shown) and other powered devices (not shown) to reduce customer demand for the utility's or the customer's benefit. Control duration, bandwidth of control, override by the customer, and confirmation of device actions are some of the parameters configurable by the utility service provider.

The meter management logic 214 may also trigger alarms to third-party communications devices (not shown) including, but not limited, to cell phones, PDAs, computers, IVRs, pagers, and radios. Alarm events, alarm times, alarm formats, and alarm recipients are some of the parameters configurable by the utility service provider.

The meter management logic 214 may also detect customer tampering with utility equipment including the collar 103, and report to the utility service provider any such tampering. The utility service provider will define what parameters constitute tampering, alarms, and alarm recipients. The meter management logic 214 may also provide configurable system alarms and/or interfacing to customer-owned equipment.

The meter management logic 214 may calculate a forward daily available power based upon the customer 101's credit balance, historical average daily usage, and daily average determinants. The meter management logic 214 allows a utility service provider to incorporate fixed monthly charges along with the actual usage by utilizing different rate structures to allocate these fixed charges on a daily basis based on the current day's rate tariff. The meter management logic 214 may perform certain calculations regarding the customer 101's utility usage for display on the CIU 104. Examples of such calculations are: the dollars remaining in the customer 101's account; the estimated days remaining based upon current utility usage; the current usage-per-hour; the customer 101's usage for the previous 24 hours; the customer 101's usage for the previous 7 days; and the customer 101's usage for the previous 30 days.

In certain situations, the meter management logic 214 may operate in a "pass through mode," in which the collar 103 ignores disconnect commands and other commands from the billing server 106. The pass through mode may be utilized, for example, when a collar 103 is installed at a premises that is not using the functionality of the system 100. An example of this is an apartment complex in which all of the units are set up with a collar 103 and CIU 104 to be used in conjunction with a particular utility service; however, an individual tenant in a deregulated state may choose a different utility service. In that instance, the collar is essentially "dead," and no commands from the billing server 106 are implemented.

Meter data 223 may comprise customer usage history, billing history, and other such data. Meter data 223 further may comprise payment history received from billing server 106. Meter data 223 further may comprise data indicative of the monthly calculated bill. One embodiment of the meter data 223 is illustrated in FIG. 6.

Figure 6:
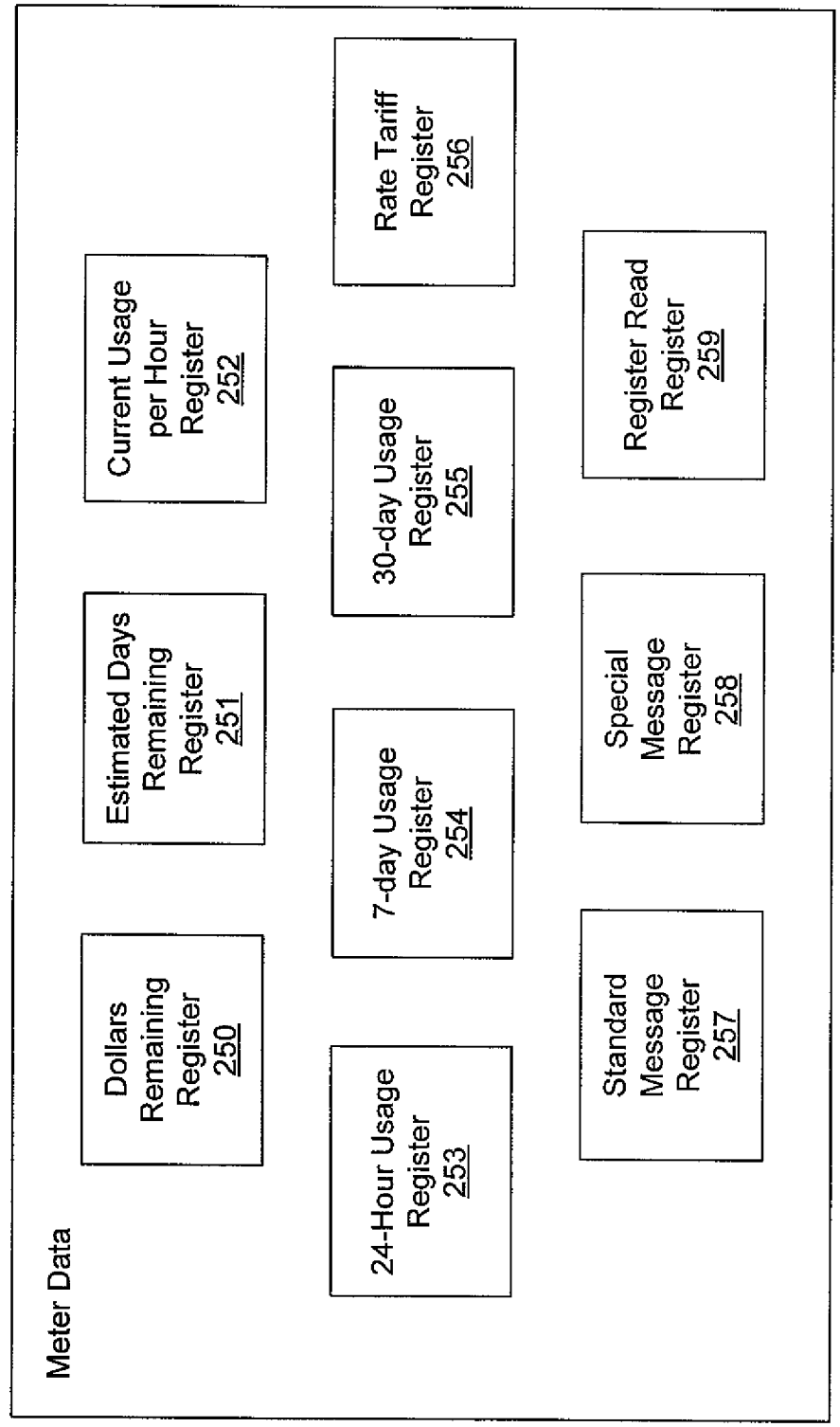
FIG. 6 depicts exemplary meter data of the system of FIG. 1.

As illustrated in the exemplary embodiment of FIG. 6, meter data 223 may comprise one or more of the following data registers: a dollars remaining register 250; an estimated days remaining register 251; a current usage-per-hour register 252; a 24-hour usage register 253; a 7-day usage register 254; a 30-day usage register 255; a rate tariff register 256, a standard message register 257; a special message register 258 and/or a register read register 259. Registers 250-59 may be of any suitable type of computer memory known in the art, such as RAM, ROM, flash-type, and the like.

The dollars remaining register 250 comprises data indicative of the credit remaining in the customer 101's account (not shown). The estimated days remaining register 251 comprises data indicative of the number of days or hours of pre-paid service remaining, based upon the customer 101's customary usage patterns. The current usage-per-hour register 252 comprises data indicative of the actual dollars-per-hour and/or kilowatts-per-hour usage rate the customer 101 is experiencing at any given time. Alternatively or in addition, the current usage-per-hour register 252 may comprise data in kilo-watts per hour. The 24-hour usage register 253 comprises data indicative of the dollar value of the power used within the previous twenty-four (24) hours, in terms of dollars. Alternatively or in addition, the 24-hour usage register 253 may comprise data indicative of the amount of power in kilowatt-hours used within the previous twenty-four (24) hours. The 7-day usage register 254 comprises data indicative of the dollar value of the power used within the last seven (7) days. Alternatively or in addition, the 7-day usage register 254 may comprise data indicative of the amount of power in kilowatt-hours used within the previous seven (7) days. The 30-day usage register 255 comprises data indicative of the dollar value of the power used within the last thirty (30) days. Alternatively or in addition, the 30-day usage register 255 may comprise data indicative of the amount of power in kilowatt-hours used within the previous thirty (30) days.

The rate tariff register 256 comprises data indicative of the current rate tariffs (for example, in cents per kilowatt hour) of the applicable utility. Some utilities have variable rate pricing in which the rates are higher during peak usage times and lower during lower usage times. The CIU 104 may display the current rate so that a customer 101 can, for example, check the rate before using certain appliances and may thus decide to defer use until a cheaper rate is in effect.

The standard message register 257 comprises data indicative of predefined messages (not shown) that the utility (not shown) may desire to transmit to the customer 101. Such messages may be transmitted from the billing server 106 via the data server 107 to the collar 103 and may be displayed on the CIU 104. Examples of such standard messages are impending disconnect warnings, reconnect notifications, and the like.

Some utilities offer "demand side management," in which the utility can control major appliances of the homeowner to redistribute peak power usage to off-peak time. For example, the utility may elect to turn of a customer's water heater for two hours during peak usage time. The utility could, for example, send a standard message to the customer 101 to notify it that the water heater will be off for a period of time.

The special message register 258 comprises data indicative of special (i.e. ad hoc) messages that the utility (not shown) may desire to transmit to the customer 101. Examples of such special messages are inclement weather notices, and the like. The register read register 259 comprises data indicative of the contents of all of the above-described registers.

Collar 103 comprises a housing (not shown) with load carrying terminals that interface with the meter socket housing 108 and meter 102. Collar 103 may also comprise an optional battery, current measuring circuitry, and one or more antennas (not shown).

FIG. 3 depicts an exemplary billing server 106 of the present disclosure. The exemplary billing server 106 generally comprises a utility processing unit 304, a utility output device 324, a utility input device 308, and a utility communication device 312, all communicating over a utility local interface 306. The billing server 106 further comprises remote meter management logic 314 and customer data 323, which can be software, hardware, or a combination thereof. In the exemplary billing server 106, the remote meter management logic 314 and the customer data 323 are shown as stored in memory 302.

The utility processing unit 304 may be a digital processor or other type of circuitry configured to run the remote meter management logic 314 by processing and executing the instructions of the remote meter management logic 314. The utility processing unit 304 communicates to and drives the other elements within the billing server 106 via the local interface 306. Furthermore, the utility input device 308 can be used to input data from a user (not shown) of the billing server 106. An exemplary utility input device 308 may include, but is not limited to, a keyboard device, a switch, a mouse, a serial port, scanner, camera, microphone, or other type of interface or local access network connection. An exemplary output device 324 may include, but is not limited to, a computer display.

In the exemplary billing server 106 of FIG. 3, the remote meter management logic 314 and customer data 323 are shown, as indicated hereinabove, as being implemented in software and stored in utility memory 302. However, remote meter management logic 314 and customer data 323 may be implemented in hardware, software, or a combination of hardware and software in other embodiments.

The remote meter management logic 314 downloads the customer data 323 from the collar 103 via the utility communication device 312 and stores such customer data 323 obtained in memory 302. The utility communication device 312 interfaces between the billing server 106 and the network 105 and may comprise software, hardware, or a combination thereof. The utility communication device 312 may consist of, for example, a LAN radio, a WAN radio, a universal serial bus (USB) port, or other devices suitable for connection to the network 105.

In one embodiment, the remote meter management logic 314 is software written with "web services." "Web services" refers to an open standard based web application. A web services application can communicate over the internet with another web services application using a standard XML messaging system.

The remote meter management logic 314 also receives the meter data 223 (FIG. 2) and the server data 423 (FIG. 4) from the collar 103 and the remote data server 107, respectively, across the network 105 via utility communication device 312. The remote meter management logic 314 transmits customer balances and other customer data 323 across the network 105 via the utility communication device 312. The remote meter management logic 314 also transmits customer balances and other customer data 323 to other devices, such as utility GUI's (not shown) via the utility output device 324, which may be software, hardware, or a combination thereof. The output device 324 may comprise any number of communications mediums known in the art. The remote meter management logic 314 creates and maintains customer accounts for the utility and monitors the monetary balances for each customer.

The remote meter management logic 314 may further determine that a particular customer's account has been depleted and may generate a utility service disconnect notification for transmission to the collar 103 and ultimately for display on the CIU 104.

The remote meter management logic 314 further processes payments by the customer 101 and sends updated account information to the customer 101 via the collar 103 to the CIU 104. The remote meter management logic 314 may further delay, override and/or suspend service disconnects based upon new payments made by the customer 101 or other factors.

The remote meter management logic 314 may also generate one or more predetermined countdown milestones (not shown), which milestones are used by the meter management logic 214 to generate warnings to the customer 101 of an upcoming utility disconnect unless additional funds are deposited with the utility. Alternatively, the predetermined countdown milestones may be generated within the collar 103. The predetermined countdown milestones are configurable by the utility (not shown).

The customer data 323 may comprise data indicative of amounts pre-paid by a customer, usage history billing information, the customer name, account number, usage data, and the like.

FIG. 4 depicts an exemplary data server 107 according to the present invention. The data server 107 generally comprises a data processing unit 404, server logic 414, server data 423, and collar interface logic 413. The data processing unit 404 may be a digital processor or other type of circuitry configured to run the server logic 414 by processing and executing the instructions of the server logic 414. The data processing unit 404 communicates to and drives the other elements within the data server 107 via a local interface 406, which can include one or more buses. Furthermore, a data input device 408, for example, a keyboard, a switch, a mouse, and/or other type of interface, can be used to input data from a user (not shown) of the data server 107.

The server data 423 comprises data describing characteristics of at least one meter 102 [FIG. 1]. For example, the server data 423 may comprise meter configuration information, data indicative of real-time meter reads, or status of the meters. The server data 423 comprises real-time meter read data indexed by the particular meter(s) read.

In the exemplary data server 107 of FIG. 4, the server logic 414, server data 423, and collar interface logic 413 are shown, as indicated hereinabove, as being implemented in software and stored in utility memory 402. However, server logic 414, server data 423, and collar interface logic 413 may be implemented in hardware, software, or a combination of hardware and software in other embodiments. In one embodiment, server logic 414 is software stored in memory 402. Notably, server logic 414 can also be a web service application as described above with reference to FIG. 3.

Server logic 414 manages data flow between the collar 103 and the billing server 106. In addition, the server logic 414 manages data flow from the access device 109 and the collar 103. The data server 107 further comprises collar interface logic 413. In one embodiment, collar interface logic 413 as shown is software stored in memory 402.

During operation, the server logic 414 receives from the billing server 106 a request for a meter read. The server logic 414 stores data in server data 423 indicative of the read request. When such data is stored in server data 423, the collar interface logic 413 transmits a request to the collar 103 [FIG. 1] requesting a real-time meter read. The collar 103 transmits data indicative of a meter read to the collar interface logic 413 via communication device 412. Communication device 412 may be a modem, T1 line, router, wireless communication device, or the like. Upon receipt of the real-time meter read, the collar interface logic 413 stores data indicative of the real-time meter read in server data 423. Server logic 414 transmits the real-time meter read to the billing server 106. Collar interface logic 413 translates communications between the collar 103 and the server logic 414.

In addition to doing meter reads, the server logic 414 downloads data indicative of payment history corresponding to a customer 101 to the collar 103. The server logic 414 further integrates with the billing server 106 to accept payments from the customer 101 for prepaid power. The server logic 414 facilitates the transmission of payment data to the collar 103, which messages (not shown) related to payment data to the CIU 104.

The server logic 414 further may initiate commands to override a scheduled disconnect upon prompting by the billing server 106 or the collar 103. The server logic 414 further may postpone a scheduled disconnect for a period of time. By way of example, suppose the customer 101's utilities are scheduled to be disconnected in one day's time, but the next day is a weekend or holiday in which reconnection may be scheduled. The utility may choose to postpone or override a scheduled disconnect, and would input this data via the utility server 106

The server logic 414 further may transmit to the collar 103 the standard messages and special messages (not shown) initiated by the utility from the billing server 106 for display on the CIU 104, as further discussed herein. Alternatively the standard messages and special messages may be initiated within the collar 103.

An exemplary data input device 408 may include, but is not limited to, a keyboard device, serial port, scanner, camera, microphone, or local access network connection. An exemplary data output device 424 may include, but is not limited to, a computer display.

Figure 5:
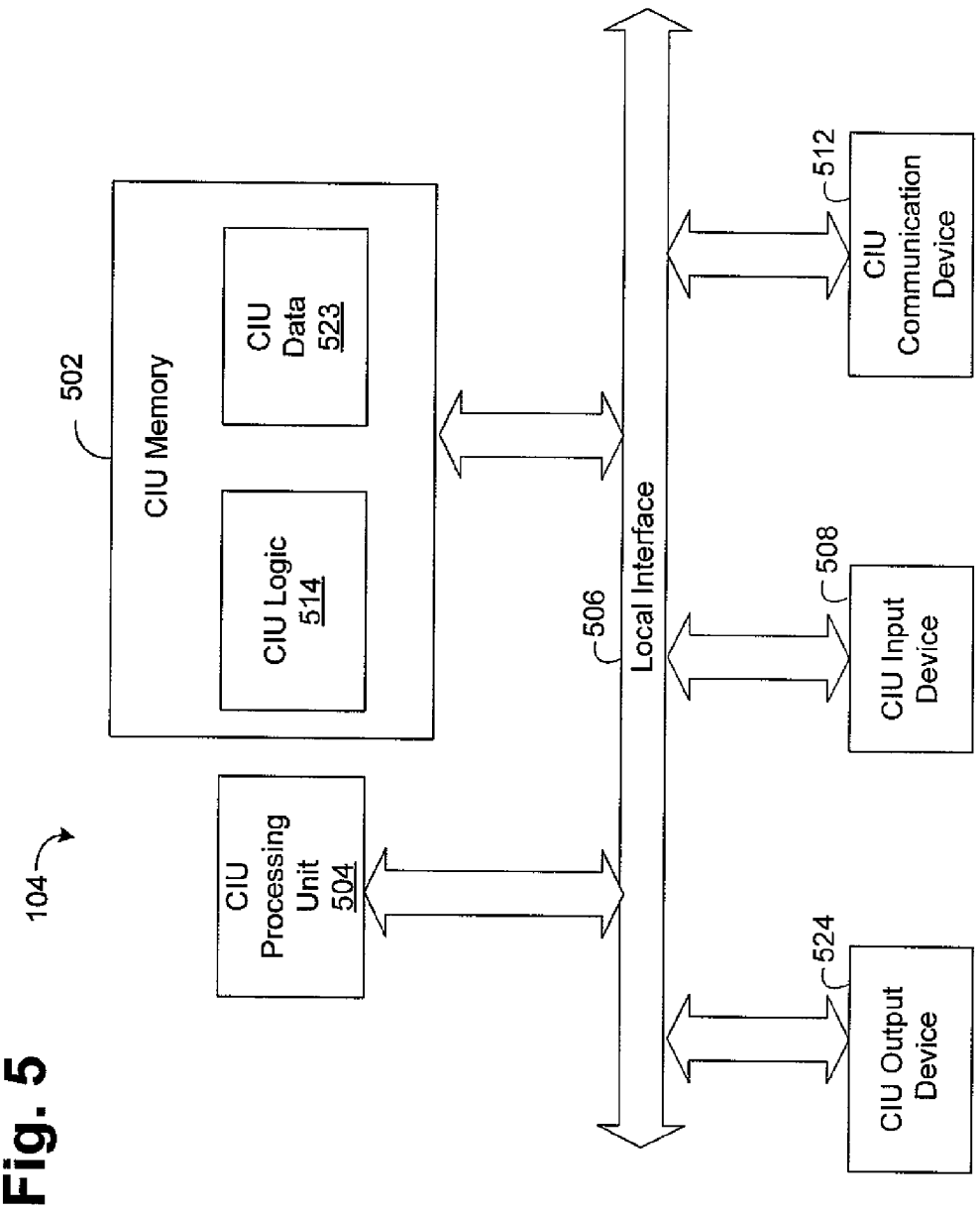
FIG. 5 depicts an exemplary customer interface unit of the system of FIG. 1.

FIG. 5 depicts an exemplary CIU 104 of the present disclosure. The exemplary CIU 104 generally comprises CIU processing unit 504, CIU output device 524, CIU input device 508, and CIU communication device 512, all communicating over utility local interface 506. CIU 104 further comprises CIU logic 514 and CIU data 523, which can be software, hardware, or a combination thereof. In the exemplary CIU 104, CIU logic 514 and CIU data 523 are shown as stored in memory 502.

The CIU processing unit 504 may be a digital processor or other type of circuitry configured to run the CIU logic 514 by processing and executing the instructions of the CIU logic 514. The CIU processing unit 504 communicates to and drives the other elements within the CIU 104 via a local interface 506, which can include one or more buses. Furthermore, a CIU input device 508, for example, a keypad, a switch, a mouse, and/or other type of interface, can be used to input data from a customer 101 [FIG. 1]. In addition, communication device 512 connects the CIU 104 with the collar 103 for communication with the collar 103 and/or the data server 107 (FIG. 1).

In the exemplary CIU 104 of FIG. 5, the CIU logic 514 and CIU data 523 are shown, as indicated hereinabove, as being implemented in software and stored in CIU memory 502. However, CIU logic 514 and CIU data 523 may be implemented in hardware, software, or a combination of hardware and software in other embodiments.

The CIU logic 514 downloads the CIU data 523 from the collar 103 via the utility communication device 512 and stores such CIU data 323 obtained in memory 502. The CIU communication device 512 interfaces between the CIU 104 and the collar 103 and may comprise software, hardware, or a combination thereof. CIU communication device 512 may comprise any number of communications mediums known in the art, for example a wireless solution such as ZigBee 802.11b or through power line carrier (PLC), or the like, The CIU data 523 may include metering data such as voltage and current data, power quality data including voltage transients, harmonics, power factor analysis, energy usage data and anticipated energy consumption over a specified time period in the future or historical consumption in the past. The CIU data 523 may also consist of messages to the customer 101 regarding its pre-pay usage, such as how many days of power remain, or that a power disconnect is pending.

Figure 7:
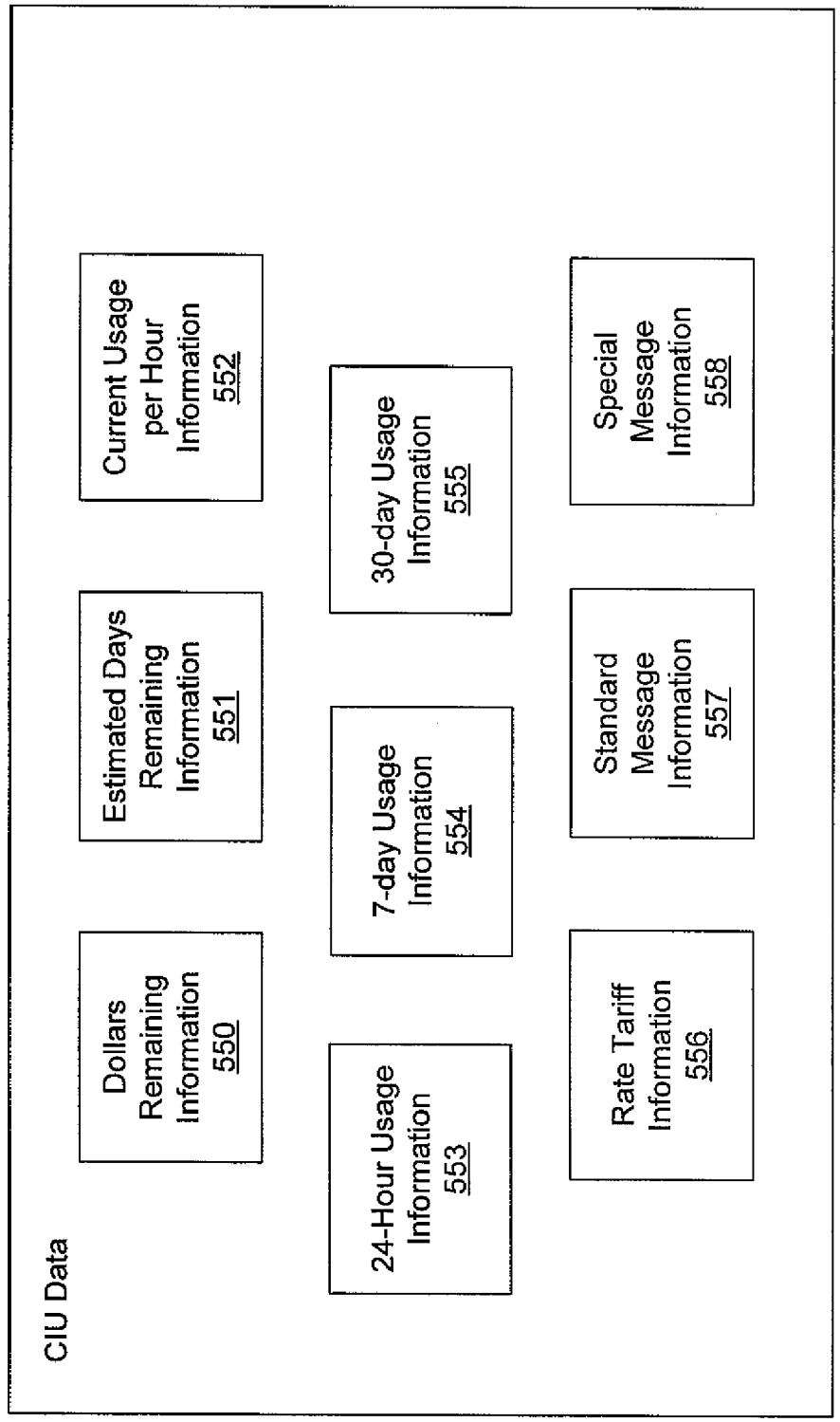
FIG. 7 depicts exemplary customer interface unit data of the system of FIG. 1.

As illustrated in FIG. 7, the CIU data 523 may comprise one or more of the following types of data: dollars remaining data 550; estimated days remaining data 551; current usage-per-hour data 552; 24-hour usage data 553; 7-day usage data 554; 30-day usage data 555; rate tariff data 556; special message data 557; and/or ad hoc message data 558. The dollars remaining data 550 comprises data indicative of the credit remaining in the customer 101's account (not shown). The estimated days remaining data 551 comprises data indicative of the number of days and/or hours of pre-paid service remaining, based upon the customer 101's customary usage patterns. The current usage-per-hour data 552 comprises data indicative of the actual dollars-per-hour and/or kilowatts-per-hour usage rate the customer 101 is experiencing at any given time. Alternatively or in addition, the current usage-per-hour data 552 may comprises data in kilo-watts per hour. The 24-hour usage data 553 comprises data indicative of the dollar value of the power used within the preceding twenty-four (24) hours, in terms of dollars and/or kilowatt-hours. The 7-day usage data 554 comprises data indicative of the dollar value (or kilowatt-hour value) of the power used within the previous seven (7) days. The 30-day usage data 555 comprises data indicative of the dollar value (or kilowatt-hour value) of the power used within the last thirty (30) days. The rate tariff data 556 comprises data indicative of the current rate tariffs of the applicable utility. The standard message data 557 comprises data indicative of predetermined messages (not shown) that the utility (not shown) may desire to transmit to the customer 101. Examples of standard message data 557 are impending disconnect warnings, reconnect notifications, and the like. The special message data 558 comprises data indicative of ad hoc messages that the utility may desire to transmit to the customer 101. Examples of such special messages are inclement weather notices, amber alerts, and the like.

An exemplary CIU input device 508 may include, but is not limited to, a keyboard device, keypad, touch screen, switch, serial port, scanner, camera, microphone, web portal, cellular telephone, wireless personal digital assistant, or local access network connection.

In some embodiments of the invention, customer 101 may input certain information into the input device 508, such as an acknowledgement of a message received from the utility. For example, the CIU output device 524 may display to the customer 101 the standard message 557 that the utility service will be disconnected in three (3) days and the device 524 may display the standard message 557 requesting that the customer 101 acknowledge receipt of this information by pressing a button (not shown) on the input device 508. Once the customer 101 acknowledges receipt of the message, the utility has positive proof of notification of an impending shutdown.

By way of another example, once a customer 101 whose service has been disconnected pays money to the utility so that his account has a positive balance, the CIU output device 524 may display to the customer 101 the standard message 557 that the system is ready to reconnect power upon acknowledgment by the customer 101. The customer 101 may acknowledge his readiness to receive reconnection of utility service by pressing a button on the input device 508.

An exemplary output device 524 may include, but is not limited to, a computer display, an LCD, a cellular phone or wireless display device (such as a personal digital assistant (PDA)) for displaying text messages. The exemplary output device 524 may also include an audible alarm, which may, for example, be used in conjunction with a storm warning or may accompany a message of impending service disconnect.

An exemplary CIU 104 according to one embodiment of the present disclosure comprises a housing (not shown) about six (6) inches wide by four (4) inches high by one (1) inch deep. The housing comprises a built in display device 524 in the form of an LCD and an input device 508 in the form of buttons (not shown). For example, the buttons may comprise a button for scrolling right, a button for scrolling left, a button for scrolling up, a button for scrolling down, and a centrally-located "enter" button disposed between the buttons for scrolling.

Figure 8:
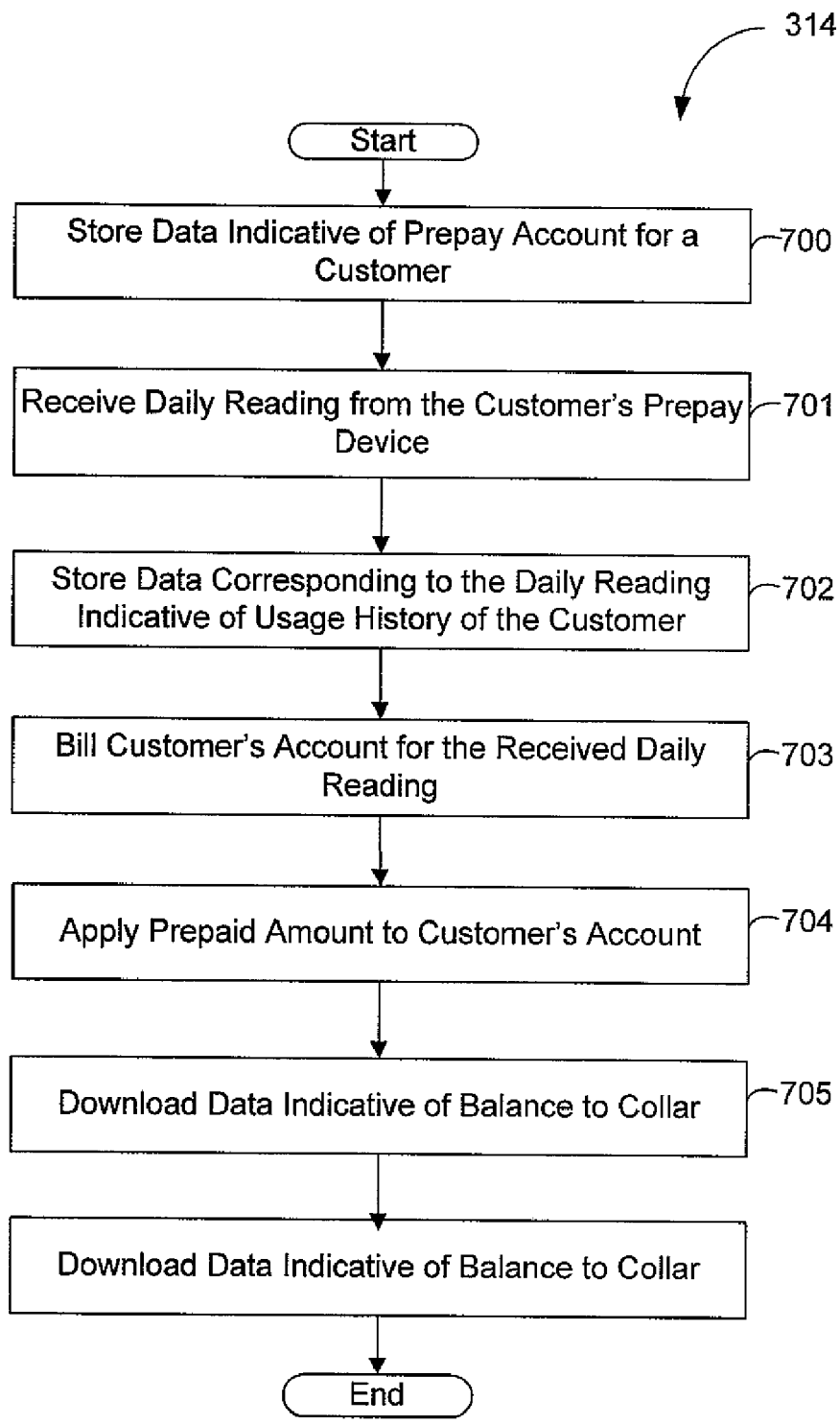
FIG. 8 is a flow chart illustrating exemplary architecture and functionality of the remote meter management logic of FIG. 3.

FIG. 8 is a flowchart that depicts exemplary architecture and functionality of the remote meter management logic 314 [FIG. 3]. Referring to step 700, the remote meter management logic 314 stores data indicative of a pre-pay account for a customer. In step 701, the remote meter management logic 314 receives a daily reading from the customer's pre-pay device. In step 702, the remote meter management logic 314 stores data corresponding to the daily reading indicative of the customer's usage history. In step 703, the remote meter management logic 314 bills the customer's account for the received daily reading. In step 704, the remote meter management logic 314 applies the pre-paid amount to the customer's account. In step 705, the remote meter management logic 314 downloads data indicative of the remaining balance to the collar 103.

Figure 9:
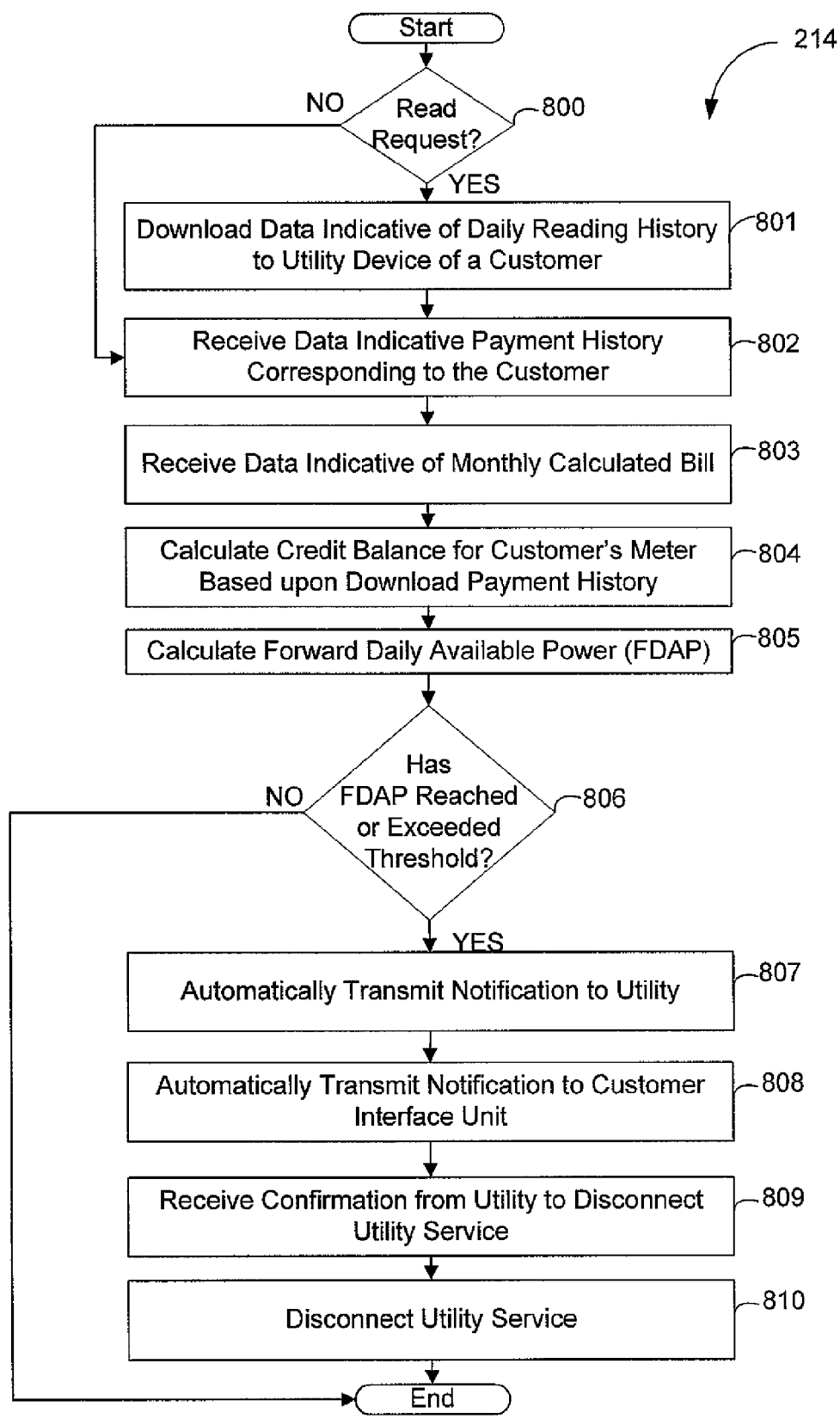
FIG. 9 is a flow chart illustrating exemplary architecture and functionality of the meter management logic of FIG. 2.

FIG. 9 is a flowchart that depicts exemplary architecture and functionality of the meter management logic 214 [FIG. 2]. Referring to step 800, the meter management logic 214 may receive a read request from the utility service company (not shown) or may generate a read request based upon a predetermined read schedule. If a read request is present, the meter management logic 214 downloads data indicative of a daily reading history, as shown in step 801. Referring to step 802, the meter management logic 214 receives data indicative of a customer's payment history. Next, in step 803, the meter management logic 214 receives data indicative of the customer's monthly calculated bill. In step 804, the meter management logic 214 calculates the credit balance for the customer's meter based upon the downloaded payment history. The meter management logic 214 then calculates the Forward Daily Available Power (FDAP), as shown in step 805. In step 806, if the FDAP has reached or exceeded a predetermined threshold, the meter management logic 214 automatically transmits a notification to the utility (step 807). Standard message data 557 [FIG. 7], for example a message that the customer's account balance has been depleted, is displayed on the CIU 104 (step 808). Upon receipt of a confirmation from the utility to disconnect the utility service (step 809), the meter management logic 214 disconnects the utility service (step 810).

In some embodiments of the invention, the meter management logic 214 carries out procedures of certain utility service providers to provide advance notice(s) to the customer of an impending service disconnect, and such notice(s) may be displayed on the CIU 104. Further, some utility service providers require customers to acknowledge an impending service disconnect, and customers may use the CIU 104 [FIG. 5] to provide such an acknowledgement, for example, via a CIU 104 input device 508, such as by pressing a button (not shown) on the CIU 104.

Figure 10:
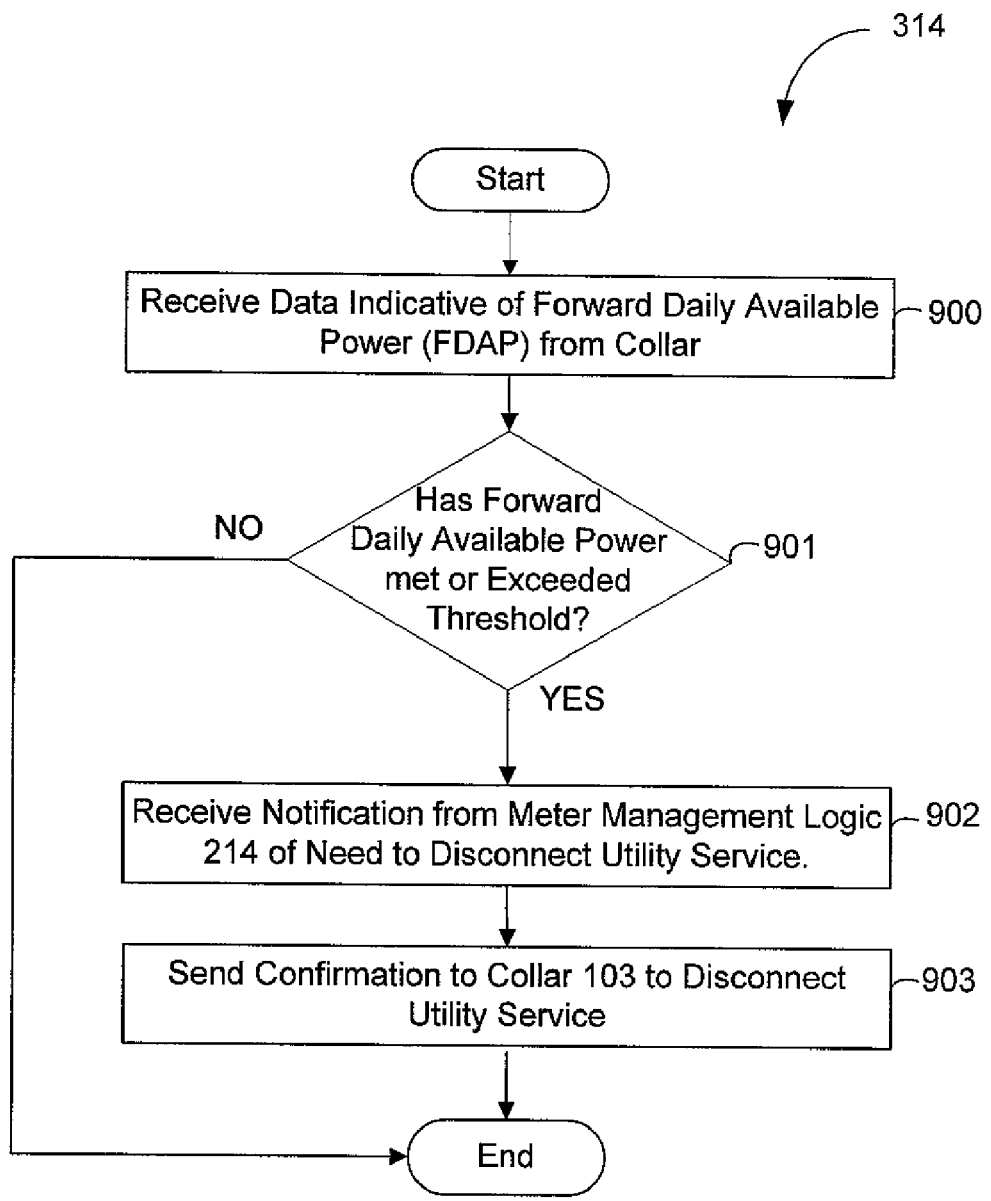
FIG. 10 is a flow chart illustrating alternative exemplary architecture and functionality of the remote meter management logic of FIG. 3.

FIG. 10 is a flowchart that depicts exemplary architecture and functionality of the remote meter management logic 314 [FIG. 3]. Referring to step 900, the remote meter management logic 314 receives data indicative of the FDAP from the collar 103 [FIG. 1]. If the FDAP exceeds or meets a threshold value, as shown in step 901, the remote meter management logic 314 will receive a notification from meter management logic 214 [FIG. 7]. The remote meter management logic 314 will then send a confirmation to the collar 103 to disconnect the utility service (step 903).

In addition to the embodiments described herein, the present invention may also be in the form of a utility meter 102 with all of the features of the present invention that are described as residing in collar 103 instead incorporated into the utility meter 102.

This invention may be provided in other specific forms and embodiments without departing from the essential characteristics as described herein. The embodiment described is to be considered in all aspects as illustrative only and not restrictive in any manner.

As described above and shown in the associated drawings and exhibits, the present invention comprises a collar-based system and method for monitoring and displaying utility information. While particular embodiments of the invention have been described, it will be understood, however, that the invention is not limited thereto, since modifications may be made by those skilled in the art, particularly in light of the foregoing teachings. It is, therefore, contemplated by the appended claims to cover any such modifications that incorporate those features or those improvements that embody the spirit and scope of the present invention.

What is claimed is:

1. A system to control delivery of utility power associated with a utility meter comprising:
  a control unit coupled to the utility meter to monitor energy delivered to a customer premises and to control said utility power to said customer premises;
  logic configured to generate customer utility usage data corresponding to the energy delivered to the customer premises; and
  a display unit communicatively coupled to the control unit to display the customer utility usage data, said display unit further including a customer input device to receive input from a customer at said customer premises; said display unit configured for location limited to said customer premises;
  said control unit further comprising:
  a control processor, said control processor configured to receive meter readings from said utility meter relating to said energy delivered to said customer premises;
  a relay controlled by said control processor, said relay to switch said utility power on or off to said customer premises; and
  a network interface between said control processor and a control server, said control server to be operated by a supplier of said utility power;
  wherein said control processor is configured to receive an energy consumption threshold level from said control server over said network interface, said energy consumption threshold level being based on customer prepayment or credit available in an account with said supplier of said utility power, said control processor is configured to compare said meter readings from said power meter with said energy consumption threshold and said control processor is configured to control said relay to turn off power to said customer premises based at least in part upon said meter readings reaching said energy consumption threshold;
  wherein said control processor is configured to receive for restored account information from said control server using said network interface when said account is restored to a positive account balance, and said control processor is configured to display said restored account information using said display unit, said control processor is configured to subsequently receive a confirmation to restore power from said customer via said customer input device at said customer premises, and said control processor is configured to control said relay to restore power to said customer premises in response to receiving said confirmation to restore power.

2. The system of claim 1, wherein the display unit comprises at least one of the following: a video display, a digital display, text message display, an email display, or a web portal display.

3. The system of claim 1, wherein the control unit further comprises a communication device.

4. The system of claim 3, wherein the display unit is remote to the control unit and the communication device is configured to transmit the customer utility usage data to the display unit.

5. The system of claim 1, wherein said control unit resides in a collar unit,
said collar unit configured to mount between said meter and a meter base, said collar unit configured to electrically couple to said meter to said meter base, said collar unit configured to mount on said meter base and said collar unit configured to mount said meter on said collar unit;
said collar unit configured to receive utility power from a power provider through said meter base and to provide said power to said meter, said collar unit configured to receive measured power from said meter and to provide said measured power to a consumer through said meter base.

6. The system of claim 1, wherein the customer input device is a switch.

7. A method for controlling delivery of utility power from a utility provider to a customer premises, comprising the steps of:
a control unit at said customer premises receiving at least one reading from a utility meter monitoring said delivery of utility power to said customer premises;
said control unit transmitting utility meter data indicative of the at least one reading to said utility provider;
determining an amount of available prepaid utility service remaining for said customer premises based upon the utility meter data transmitted; and
displaying data indicative of the amount of prepaid utility service remaining using a customer display unit configured for location limited to said customer premises;
said control unit receiving at said customer premises an energy consumption threshold level from said utility provider over a network, said energy consumption threshold level being based on customer prepayment or credit available in an account with said utility provider;
said control unit comparing said energy consumption readings from said power meter with said energy consumption threshold, and said control unit controlling said relay to turn off power to said customer premises based at least in part upon said at least one meter reading reaching said energy consumption threshold;
receiving restored account information from said utility provider over said network in response to said account being restored to a positive account balance;
said control unit displaying said restored account information using said customer display unit;
subsequently, said control unit receiving a confirmation to restore power from said customer display unit via a customer input device at said customer premises and located with said customer display unit;
said control unit controlling said relay to restore power to said customer premises in response to said receiving said confirmation to restore power.

8. The method of claim 7, wherein the control unit is in wireless communication with the customer display unit.

9. The method of claim 7, wherein the control unit and the customer display unit communicate via a power line carrier.

10. The method of claim 7, wherein the customer display unit displays a message in the form of at least one of the following: a digital display, a video display, a text message, an e-mail, or a web portal.

11. A system to control delivery of utility power associated with a utility meter, comprising:
a control unit communicatively coupled to a utility meter to monitor a utility usage by a customer premises;
logic configured to determine whether the utility usage has exceeded a threshold; and
said control unit bi-directionally communicatively coupled to a billing server via a network, wherein the control unit is configured to transmit customer utility data to the billing server using said network;
said control unit comprising:
a control processor, said control processor configured to receive meter readings relating to energy delivered to said customer premises through said utility meter;
a display unit communicatively coupled to said control processor to display information relating to said delivery of utility power, said display unit comprising a customer input device to receive input from a customer at said customer premises; said display unit configured for location limited to said customer premises;
a relay controllable by said control processor, said relay to switch said utility power on or off to said customer premises; and
a network interface to said network between said control processor and said billing server, said billing server to be operated by a supplier of said utility power;
wherein said control processor is configured to receive an energy consumption threshold level from said billing server over said network interface, said energy consumption threshold level being based on customer prepayment or credit available in an account with said supplier of said utility power, said control processor is configured to compare said meter readings from said power meter with said energy consumption threshold, and said control processor is configured to control said relay to turn off power to said customer premises based, at least in part, upon said meter readings reaching said energy consumption threshold;
wherein said control processor is configured to receive restored account information from said control server using said network interface when said account is restored to a positive account balance, and said control processor is configured to display said restored account information using said display unit, said control processor is configured to subsequently receive a confirmation to restore power from said customer via said customer input device at said customer premises, and said control processor is configured to control said relay to restore power to said customer premises in response to receiving said confirmation to restore power.

12. The system of claim 11, wherein the control unit is configured to display an impending power shut-off notification message at said customer premises a predetermined amount of time prior to exceeding the energy consumption threshold.

13. The system of claim 12, wherein the billing server is configured to request the customer utility data.

14. The system of claim 12, wherein the control unit is configured to automatically transmit the customer utility data to the billing server.

15. The system of claim 14, wherein the control unit comprises logic configured to calculate a forward daily available power (FDAP).

16. The system of claim 15, further including a display of a notification of impending disconnection, wherein the relay is configured to automatically disconnect utility services upon receipt of customer response data indicative of receipt of said notification of impending disconnection.

17. The system of claim 16, wherein the system is configured to disconnect the utility services provided that the billing server sends a confirmation of service disconnect.

* * * * *